United States Patent [19]

Clark et al.

[11] 4,062,373

[45] Dec. 13, 1977

[54] METHOD AND APPARATUS FOR MIXING GASES

[76] Inventors: Justin S. Clark, 720 E. 3120 South, Salt Lake City, Utah 84106; Wm. Dean Wallace, 408 Second Ave., Salt Lake City, Utah 84103

[21] Appl. No.: 790,437

[22] Filed: Apr. 25, 1977

Related U.S. Application Data

[63] Continuation-in-part of Ser. No. 547,856, Feb. 7, 1975, Pat. No. 4,019,523.

[51] Int. Cl.² .................... G05D 11/03; G05D 11/13
[52] U.S. Cl. .................................... 137/3; 137/607; 137/624.2
[58] Field of Search ............... 137/3, 7, 111, 505.19, 137/606, 607, 624.2

[56] References Cited

U.S. PATENT DOCUMENTS

| | | | |
|---|---|---|---|
| 3,762,427 | 10/1973 | Möllering | 137/7 |
| 3,886,971 | 6/1975 | Lundsgaard et al. | 137/606 X |
| 3,905,384 | 9/1975 | Berger | 137/606 X |

*Primary Examiner*—Alan Cohan
*Assistant Examiner*—Gerald A. Michalsky
*Attorney, Agent, or Firm*—B. Deon Criddle

[57] ABSTRACT

A method of accurately mixing gases in desired proportions which comprises establishing the gases to be mixed at a uniform pressure; sequentially feeding the gases through a common restrictor for proportionate time periods to give the gas mix desired. The apparatus used includes a pressurizing gas reservoir unit which adjusts all gases to be mixed to have a common pressure; electronically actuated rapid response fluidic interface valves; a common restrictor through which the gases are passed to a receiving and mixing chamber; and timing means controlling the valves to allow gases to be sequentially passed therethrough for pre-set time periods.

10 Claims, 3 Drawing Figures

METHOD AND APPARATUS FOR MIXING GASES

This application is a continuation-in-part of application Ser. No. 547,856 filed Feb. 7, 1975, now U.S. Pat. No. 4,019,523.

BRIEF DESCRIPTION OF THE INVENTION

1. Field of the Invention

This invention relates to methods and apparatus for mixing diverse gases in closely regulated proportions. It finds use in those operations where precise measurements and control of gas mixtures are critical to system success. For example, it has been found that by establishing gas mixes providing the same concentration of gases, i.e. $O_2$ or $CO_2$ in the mix as is measured in a blood sample and by using the measured gas concentrations of the mix as a basis for percent gas determination, errors resulting from direct reading or from defective readings of the gas directly from a blood sample can be largely avoided. A relatively simple and low cost gas mixer has great practical application in research laboratories, pulmonary function laboratories and in other areas.

2. Prior Art

Various methods of mixing gases in predetermined ratios have been proposed in the past. The most accurate previously known gas mixers known to applicants are mechanical piston type devices that offer fixed gas ratios that are determined by the choosing of various piston-gearing combinations. There has also been available a mixer which operates by combining fixed flows of several gases. The individual gas flows are maintained constant by providing accurately regulated pressure sources and by providing constant flow limiters for each gas. This device has a fixed mixing ratio.

In connection with the determination of gas concentrations in blood it has also been proposed that diverse gases be mixed in proportions corresponding to the proportions of the gases determined by electrodes to be present in a blood sample. The gases to be mixed are in separate reservoirs and are regulated to be at the same pressure. The samples are equilibrated with water vapor at a known temperature. The gases, under pressure, are then sequentially allowed to flow through a restrictor and a control valve to a mixing chamber. The restrictors through which each of the gases pass are adjusted to give equal flow therethrough and the control valve is operated to allow flow from each reservoir for time periods proportionate to stored signals originally generated by the gas sensing electrodes when the electrodes were measuring the gases in the blood sample. The same electrodes measure the gas mix and generate a signal that can be compared against the stored signal as an accuracy check and when the signals are matched the gas ratios in the mix and the sample are the same. Since the volumes of gases in the mix can be readily calculated from the time of flow of the gas through the control valve, the concentration of each gas in the mix can be readily determined. While the described system may be entirely satisfactory for many purposes, the accuracy of the system is dependent upon the accuracy with which the gases are mixed. This, in turn, is dependent upon the ability to maintain the gas reservoir pressures equal and the ability to control flow through the restrictors at the outlets of the reservoirs.

OBJECTS OF THE INVENTION

Principal objects of the present invention are to provide a gas mixing system wherein diverse gases can be mixed in desired proportions with greater accuracy than has been achieved using other known systems, and wherein desired accuracy can be achieved at a relatively low cost when compared with other available regulatory systems.

Other objects are to provide a gas mixing system wherein the gases are balanced against each other to provide a uniform pressure and are fed through a common restrictor so that equal flows are obtained without the need for temperature or water vapor controls.

Still other objects are to provide a gas mixer that will allow for continued varying of the gas fractions of a mix, and a unit that is readily calibrated for use with any gas.

FEATURES OF THE INVENTION

Principal features of one embodiment of the invention include an isobaric balancing system wherein diverse gases are balanced against one another to insure that the gas pressures and temperatures are uniform, a common restrictor through which the gases are passed to a mixing chamber and a timed signal generator that will operate a control valve to sequentially or on demand allow flow of the gases to the mixing chamber to achieve a desired gas mix.

In another even less costly embodiment of the invention a plurality of gases are fed into a large pressurizing reservoir to establish a common pressure head in the lines through which the plurality of gases are supplied. The gases are then fed, sequentially through a common restrictor to obtain the desired gas mixture.

Other objects and features of the invention will become apparent from the following detailed description, taken together with the accompanying drawing.

THE DRAWING

DETAILED DESCRIPTION

Figure 1:
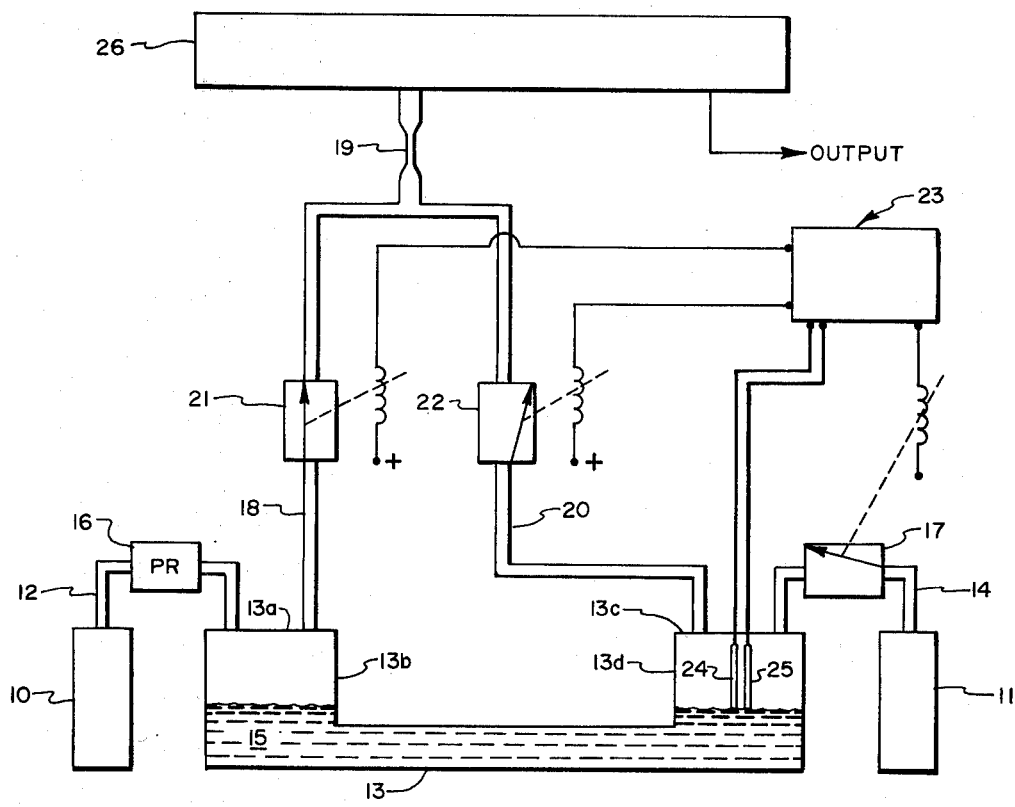
FIG. 1 is a schematic diagram of a gas mixing apparatus of the present invention.

Referring now to the drawing:

In the illustrated preferred embodiment of the invention as shown in FIG. 1, reservoirs 10 and 11 are each provided to contain a gas under pressure and the diverse gases contained therein are hereafter identified as gas 10 and gas 11. These gases, may be, for example, oxygen and nitrogen respectively or can be any other gases that it may be desired to mix. As will become apparent any number of gases can be mixed merely by expanding the system to accommodate the number used.

Reservoir 10 is connected by a conduit 12 to the upper end 13a of an upstanding leg 13b of a receptacle 13 and reservoir 11 is similarly connected by a conduit 14 to the upper end 13c of an upstanding leg 13d of the receptacle.

Water 15 in the receptacle 13 fills the lower portion of the receptacle and stands in both legs 13b and 13d when the pressures in the legs, above the water is equal.

A pressure regulating valve 16 is provided in conduit 12 and a refill valve 17 is provided to control flow through conduit 14.

A conduit 18 interconnects the upper end 13a of leg 13b of receptacle 13 to the inlet side of a restrictor 19 and a conduit 20 similarly connects the upper end 13c of the leg 13d to the inlet side of the restrictor.

Valves 21 and 22 are respectively provided in the conduits 18 and 20 to control flow therethrough. The valves 17, 21 and 22 are all solenoid valves and the valves 21 and 22 are arranged such that when one is open to allow flow therethrough, the other is closed to prevent flow therethrough.

The solenoid valves are controlled through conventional-type circuitry, shown in block diagram form at 23. The circuitry 23 also includes a pair of level sensing probes 24 and 25 that extend into the reservoir to just above the level reached by the water 15 in leg 13d when the pressures are equalized in legs 13b and 13d.

The outlet of restrictor 19 is connected to a mixing chamber 26.

In operation, pressure regulating valve 16 is set at a desired downstream pressure and gas 10 is allowed to flow therethrough until the pressure in the upper portion of leg 13b is at that set into the pressure regulating valve.

If the pressure of the gas 10 acting on the column of water 15 in leg 13b is above the pressure of gas 11 acting on the column of water in leg 13d the level of water in 13b will drop and that in leg 13d will rise. However, as soon as the level in leg 13d rises to the ends of the electrodes 24 and 25 circuit 23 operates to open the valve 17 and to allow flow of gas 11 to the upper end 13c of leg 13d. Valve 17 remains open until the water 15 no longer completes the circuit across electrodes 24 and 25, i.e. until the pressures in legs 13b and 13d above the water 15 are equalized.

Circuit 23 also includes means for generating control signals to the solenoid valves 21 and 22 and for varying the control signals to each valve according to the length of time the valve is to be opened to permit flow therethrough. Thus, if it were desired to have a gas mixture made up of 50% gas 10 and 50% gas 11, the control signals would provide for sequential opening of valves 21 and 22, with each valve being opened for the time necessary to obtain the 50/50 mix. If the gases have the same viscosity and density the valves 21 and 22 would be opened for equal time periods to give the 50/50 mix. If gases of different viscosity and density are mixed it will be necessary to calculate the different times the valves are to be opened, as will be hereinafter further explained. Since the gas pressures of gases 10 and 11 are essentially equal, and since the gases are directed through the same restrictor, it will be apparent that the volume of each gas passed through the restrictor is a direct function of time and that the concentrations of gases in the mix are therefore proportionate to the time periods the valves 21 and 22 are opened, when corrected for flow changes resulting from different viscosities and densities of the gases.

If, when valve 21 opened, the pressure at 13a should start to decrease, pressure regulating valve 16 will open to re-establish the desired pressure. Similarly, if valve 21 is closed and valve 22 is opened to allow flow therethrough and the pressure at 13c should start to drop the water level in leg 13d will rise to complete the circuit across electrodes 24 and 25. This will cause a signal to open valve 17 until the pressure balance is again established and the level of water 15 is just below the electrodes 24 and 25.

Figure 2:
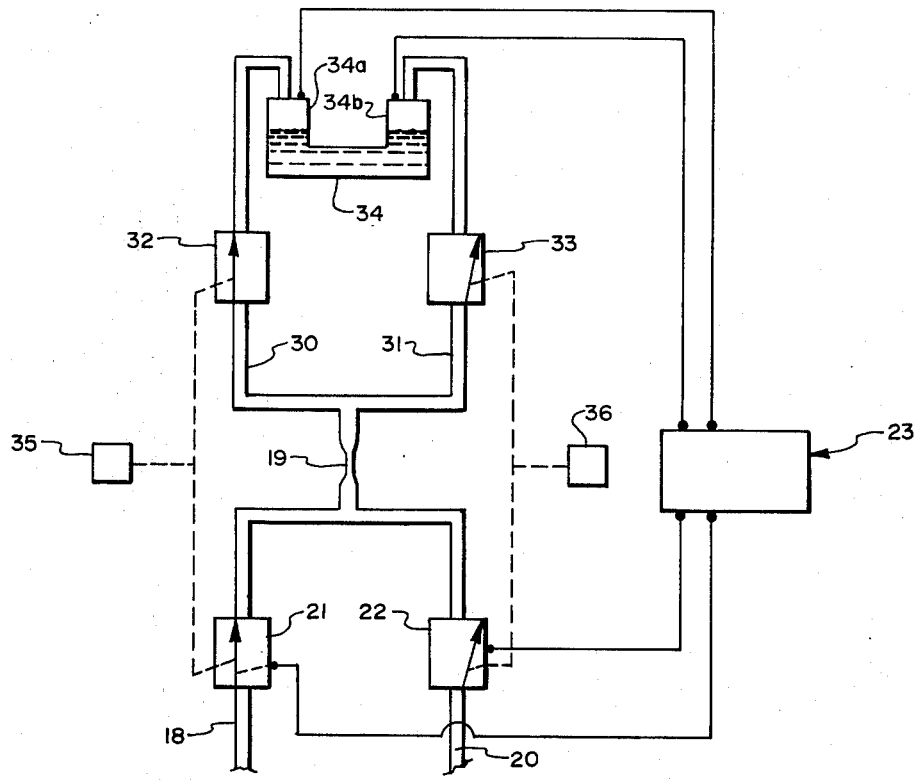
FIG. 2 is a schematic diagram of the apparatus used to calibrate the system.

In order to correct for flow changes resulting from different viscosities and densities of the gases a constant value for each gas is determined. This is easily done by connecting the flow through the restrictor to valve controlled divided calibration conduits and then into another isobaric apparatus. Thus as shown in FIG. 2, during calibration, the gas leaving restrictor 19 goes either to conduit 30 or to conduit 31. A valve 32 in line 30 is ganged to valve 21 and a similar valve 33 is ganged to valve 22 so that the valves 21 and 32 are simultaneously opened and closed and the valves 22 and 33 are simultaneously opened and closed.

The circuit 23 includes means for sensing differential pressure in the legs 34a and 34b of the isobaric apparatus 34 and, whenever the pressure is higher in leg 34a than in leg 34b, the valve 21 and ganged valve 32 is closed and valve 22 is opened along with its ganged valve 33. Conversely, a higher pressure in leg 34b will close valves 22 and 33 and will open valves 21 and 32. Counters 35 and 36 are respectively provided to monitor opening and closing of the valves.

Pulse signals generated in circuit 23 attempt to sequentially open each valve 21 and 22 in turn for equal time periods. If however, the valve is held closed by a high pressure in its associated leg of the isobaric apparatus 34 (the legs being of equal volume), no opening will be counted. The ratio of flow for the gases is then determined by the number of opening counts recorded for each of the valves 21 and 22. The same system can be used to determine the ratios of more than two gases, merely by expanding the system to include other conduits, isobaric apparatus legs, valves and counters.

If desired the volumes of the divided gases can also be measured by conventional methods to determine the flow ratio.

Knowing the flow ratios it is easily possible to calculate the time each valve 21 and 22 must be opened to give a desired gas mix in the mixing chamber 26 of FIG. 1.

Figure 3:
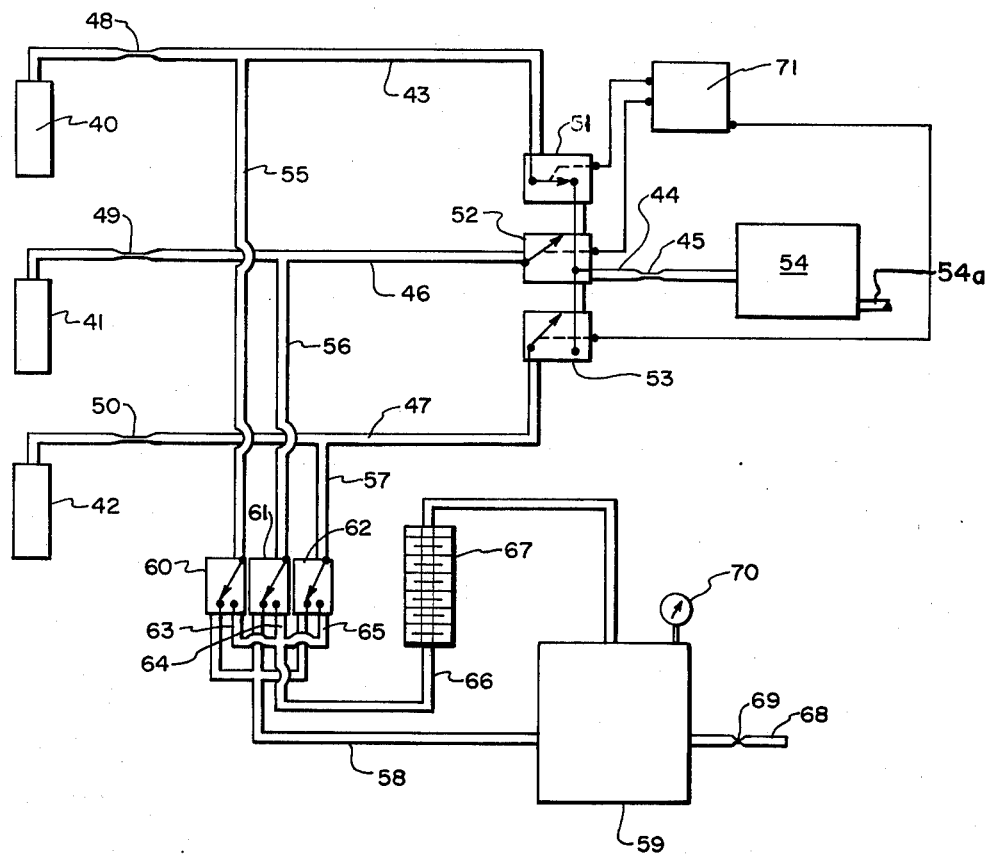
FIG. 3 is a schematic diagram of another embodiment of gas mixing apparatus of the invention.

In FIG. 3, there is shown another preferred form of apparatus of the invention.

As shown in FIG. 3, reservoirs 40, 41 and 42 are each provided to contain a gas, under pressure, and the diverse gases therein are respectively hereafter identified as gas 40, gas 41 and gas 42. These gases may be, for example, nitrogen, oxygen and carbon dioxide, but as in the previously described embodiment, other gases can be similarly mixed. It will also be apparent that, as in the previously described embodiment, the number of gases mixed can be changed, merely by expanding the system to accommodate the number used.

Reservoir 40 is connected by a conduit 43 to a conduit 44 containing a resistor 45. Similarly, reservoirs 41 and 42 are connected by conduits 46 and 47 to the conduit 44, upstream of the resistor 45.

The conduits 43, 46 and 47, respectively have restrictors 48, 49 and 50, valves 51, 52 and 53 therein. The valves 51, 52 and 53 are downstream of the restrictors 48, 49 and 50 and the valves allow flow through the conduits 43, 46 and 47 to be cut off or will allow any combination thereof to be connected to the conduit 44 and restrictor 45 and then to a mixing chamber 54. As shown, valve 51 is opened to allow flow through conduit 43 to conduit 44 and valves 52 and 53 are closed to prevent flow from conduits 46 and 47 to conduit 44.

Conduits 55, 56 and 57 are respectively connected to the conduits 43, 46 and 47, between the restrictor and valve in each said conduit and the conduits 55, 56 and 57 are each connected to a conduit 58 that discharges into a reservoir 59.

Valves 60, 61 and 62 are respectively provided in the conduits 55, 56 and 57, and the valves each provide for stopping flow, permitting flow through the conduits 55, 56 and 57, to conduit 58, or for directing flow from the respective conduits 55, 56 and 57 to conduits 63, 64 and 65 that are each connected to a conduit 66. As shown, the valves 60, 61 and 62 are all set to permit flow therethrough to conduit 58.

Conduit 66 has a flow meter 67 therein and is connected to discharge into the reservoir 59.

Reservoir 59 has a discharge conduit 68 with a restrictor 69 therein that will allow a constant leakage of gases from the reservoir 59.

A pressure gauge 70 is connected into the reservoir 59 to show pressure and pressure changes in the reservoir, if desired.

In using the system shown in FIG. 3, the gases to be mixed are sequentially supplied to the mixing chamber 54 having an outlet 54a from two or more of the reservoirs 40, 41 and 42, and through the restrictor 45.

The valves 51, 52 and 53 are manipulated by a conventional electronic controller 71 to control such flow and, as in the previously described embodiment are each opened to permit unobstructed flow to the restrictor for a time period that is proportionate to the desired concentration of the gas in the mixing chamber 54 downstream of the restrictor and the flow ratios of the gases being mixed. To insure equal pressure of the gases being mixed a surplusage of gas is constantly supplied into each of the conduits 43, 46 and 47 from the pressurized reservoirs 40, 41 and 42. The gas from reservoir 40 pressurizes conduit 43 and conduit 55, the gas from reservoir 41 pressurizes conduits 46 and 56 and the gas from reservoir 42 pressurizes conduits 47 and 57. When the valves 60, 61 and 62 or any of them are operated to permit flow therethrough to the reservoir 59, through either the conduit 58 or the conduit 66 pressure will build up in the reservoir 59, even though a small continuous constant leakage is provided through restrictor 69 and conduit 68. The pressure developed in the reservoir is then maintained essentially constant over a given period of time because the reservoir volume is large relative to the volume of gases discharged therefrom through the restrictor 69 and conduit 68. It will be apparent that the size of the reservoir 59 will be determined as a function of the flow into and out of the chamber, the total flow cycle time through the valves 51, 52 and 53 used and the permissable error allowable in the final gas mix. Typically, flow through the restrictors 48, 49 and 50 will be about sixty to eighty cc per minute and the restrictor 69 will be set such that a pressure of about 32.5 psi absolute will be maintained in a reservoir 59, having a capacity of about five hundred milliliters. Consequently for any short time period through which two or more of the valves 51, 52, and 53 are cycled, i.e. ranging from about four milliseconds to two seconds per valve, the pressure in the reservoir 59 will provide essentially the same common pressure head on the gases in the lines 55, 56 and 57 and 43, 46 and 47. Since the gases are at essentially the same balanced pressure at the restrictor 45, the mix of the gases downstream of the restrictor 45 is determined by the time periods the valves 51, 52 and 53 are opened and the flow ratios of the gases. As noted previously, the flow ratios can be determined and the controller 71 is used to then regulate the valves 51, 52 and 53 to open them as required to obtain a desired gas mix at mixing chamber 54.

Valves 60, 61 and 62 are operated to individually connect lines 55, 56 and 57 to line 66 prior to operation of the system for mixing purposes so that flow through the lines can be checked using flow meter 67. This will allow the user to be sure that the flow from each of the sources 40, 41 and 42 is sufficient to prevent back flow in the lines 55, 56 and 57 and contamination of the gases in the lines. Also, the user can readily determine from reading the flow meter that the flow in each line is not so great that there is an excessive waste of gases through the conduit 68.

Preferably flow through the system is adjusted such that a choked flow condition is established across each of the restrictors 48, 49 and 50, the restrictor 69 and the restrictor 45. As is well recognized when such conditions are established variations in downstream pressure will not adversely affect flow through the restrictors to thereby affect the upstream pressures.

Although preferred forms of our invention have been herein disclosed, it is to be understood that the present disclosure is made by way of example and that variations are possible without departing from the scope of the hereinafter claimed subject matter, which subject matter we regard as our invention.

We claim:

1. A gas mixing system comprising
a plurality of sources of diverse gases under pressure;
a common restrictor having an inlet and an outlet;
a conduit connecting each said source of diverse gas to said restrictor inlet;
means for stabilizing the pressure of gas in each conduit to be essentially the same as the pressure of gas in each other said conduit upstream of the restrictor;
a mixing chamber;
means connecting the outlet of the restrictor to the mixing chamber; and
means for sequentially allowing flow through each conduit with the time of flow through the restrictor from the conduit being proportional to a desired ratio of the gas passing through the conduit in a mix of gases in the mixing chamber.

2. A gas mixture system as in claim 1, wherein the means for stabilizing the pressure of gas in each conduit to be essentially the same as the pressure in each other said conduit comprises
a pressurizing reservoir;
means coupling each said conduit at a location upstream of the common restrictor to the pressurizing reservoir; and
means to leak gases from said pressurizing reservoir at a rate lower than the rate at which gas is supplied to said reservoir from each of said conduits.

3. A gas mixing system as in claim 2, wherein the means for stabilizing the pressure of gas in each conduit to be essentially the same as the pressure in each other said conduit comprises
an isobaric balancing apparatus having a plurality of inlets each in a separate leg thereof and each connected by conduits to one of said sources of diverse gases under pressure and having pressure responsive means between said legs;
a pressure regulating control valve in the conduit connecting one of said diverse gases to one leg of the isobaric balancing apparatus; and a sensing means fixed in the housing responsive to movement of said pressure responsive means in each other said leg beyond limits determined by the position of the sensing means.

4. A gas mixing system comprising
a plurality of sources of diverse gases under pressure;
an isobaric balancing apparatus having a plurality of inlets each in a separate leg thereof and each connected by conduits to one of said sources of diverse gases under pressure and having pressure responsive means between the legs;
a pressure regulating control valve in the conduit connecting one of said diverse gases to one leg of the isobaric balancing apparatus;
a sensing means fixed in the housing responsive to movement of said pressure responsive means in each other said leg beyond limits determined by the position of the sensing means;
a valve in each conduit connecting each other source of diverse gas to the isobaric balancing apparatus, said control valve being opened and closed in response to movement of said pressure responsive means in the associated leg;
an outlet conduit connected to each leg of the isobaric balancing apparatus;
a control valve in each outlet conduit;
a common restrictor having its inlet connected to each of the outlet conduits;
a mixing vessel connected to the discharge of the restrictor; and
circuit means for operating the valves and control valves, whereby the valves are operated in response to movement of the pressure responsive means and the control valves are sequentially opened for timed periods according to timers in the circuit means.

5. A gas mixing system as in claim 4, further including means to calibrate the system to accommodate diverse gases, and means including
a plurality of calibration conduits connected to the inlet of the restrictor;
means for directing flow from said restrictor to the calibration conduits;
a second isobaric balancing apparatus having a leg of known volume to receive each calibration conduit and pressure responsive means separating the legs;
a valve in each calibration conduit;
means ganging each control valve to a valve in a calibration conduit for corresponding movement;
a counter connected to each ganged set of valves;
means for holding the ganged valves closed when the pressure in their associated legs are above the pressures in the other legs; and
wherein the circuit means includes means to generate a pulse to sequentially open the said ganged valve for a fixed time period.

6. A method of mixing gases, which comprises the steps of
a. individually supplying the gases to be mixed from pressurized sources to a mixing chamber through a common restrictor, said gases being individually supplied from the pressurized sources at a rate above that at which they are supplied through the common restrictor to the mixing chamber;
b. supplying a portion of each said gas to be mixed, upstream of the common restrictor, to a pressurizing chamber to thereby provide a common pressure head to each of the gases; and
c. regulating the flow of each gas through the common restrictor according to a time that is proportionate to the desired concentration of the gas in the mixing chamber and flow ratios of the gases.

7. A method of mixing gases as in claim 6, further comprising regulating discharge from the pressurizing chamber to provide a constant leak having a flow rate less than that of each said gas entering said chamber.

8. A method of mixing gases as in claim 7, wherein a choked flow condition is maintained across the common restrictor.

9. A method of mixing gases as in claim 8, wherein a choked flow condition is maintained across the common restrictor and across a restrictor controlling the rate of discharge from the pressurizing chamber.

10. A method of mixing gases as in claim 6, wherein a choked flow condition is maintained across the common restrictor.

* * * * *